(12) United States Patent
Sun et al.

(10) Patent No.: US 8,723,496 B2
(45) Date of Patent: May 13, 2014

(54) SWITCHING POWER SUPPLY WITH QUICK TRANSIENT RESPONSE

(75) Inventors: Weifeng Sun, Nanjing (CN); Miao Yang, Nanjing (CN); Youshan Jin, Nanjing (CN); Sichao Liu, Nanjing (CN); Shen Xu, Nanjing (CN); Shengli Lu, Nanjing (CN); Longxing Shi, Nanjing (CN)

(73) Assignee: Southeast University, Jiangsu (CN)

( * ) Notice: Subject to any disclaimer, the term of this patent is extended or adjusted under 35 U.S.C. 154(b) by 71 days.

(21) Appl. No.: 13/582,971

(22) PCT Filed: Oct. 25, 2010

(86) PCT No.: PCT/CN2010/078069
§ 371 (c)(1),
(2), (4) Date: Sep. 5, 2012

(87) PCT Pub. No.: WO2012/016398
PCT Pub. Date: Feb. 9, 2012

(65) Prior Publication Data
US 2012/0326688 A1    Dec. 27, 2012

(30) Foreign Application Priority Data

Aug. 6, 2010    (CN) .......................... 2010 1 0248402

(51) Int. Cl.
*G05F 1/00*    (2006.01)

(52) U.S. Cl.
USPC ........................................ 323/283; 323/282

(58) Field of Classification Search
USPC .................. 323/222, 271, 282, 283, 284, 285
See application file for complete search history.

(56) References Cited

U.S. PATENT DOCUMENTS

| | | |
|---|---|---|
| 6,903,536 B2 | 6/2005 | Yang |
| 7,779,278 B2 | 8/2010 | DuBose |

(Continued)

FOREIGN PATENT DOCUMENTS

| | | |
|---|---|---|
| CN | 1853334 A | 10/2006 |
| CN | 101286701 A | 10/2008 |

(Continued)

OTHER PUBLICATIONS

International Search of corresponding PCT/CN2010/078069, dayed May 19, 2011, 6 pages.

*Primary Examiner* — Nguyen Tran
(74) *Attorney, Agent, or Firm* — Christie, Parker & Hale, LLP

(57) ABSTRACT

A switching power supply with a quick transient response is provided. A hysteretic control loop which comprises a hysteretic controller (117) and a control signal gate (116) is added to the original PWM control loop of the switching power supply. The hysteretic controller (117) is used to detect an output voltage (Vout) of the switching power supply and compare the output voltage (Vout) of the switching power supply with a reference voltage (Vref). When a load current (Iout) of the switching power supply is suddenly changed, the output voltage (Vout) of the switching power supply fluctuates. If the output voltage (Vout) of the switching power supply is in a setting range of the hysteretic voltage, output terminals (SELp, SELn) of the hysteretic controller (117) are in a low potential, and the control signal gate (116) selects output signals (Qp1, Qn1) from a PWM controller (101) as input signals of a gate signal drive circuit (106). If the fluctuation of the output voltage (Vout) of the switching power supply exceeds the setting range of the hysteretic voltage, an output terminal (SELp, SELn) of the hysteretic controller (117) outputs a high potential, and the control signal gate (116) selects output signals (Qp2, Qn2) of the hysteretic controller (117) as input signals of the gate signal drive circuit (106), so the operation of switching tubes (111, 112) at the power lever (102) of the switching power supply is controlled to stabilize the output voltage (Vout).

10 Claims, 12 Drawing Sheets

(56) References Cited

U.S. PATENT DOCUMENTS

| | | | |
|---|---|---|---|
| 7,868,600 B2 * | 1/2011 | Qiu et al. | 323/282 |
| 7,906,942 B2 * | 3/2011 | Sugahara et al. | 323/223 |
| 2006/0055389 A1 * | 3/2006 | Rice | 323/288 |
| 2008/0180078 A1 | 7/2008 | Hiasa | |

FOREIGN PATENT DOCUMENTS

| | | |
|---|---|---|
| CN | 101483386 A | 7/2009 |
| CN | 101510721 A | 8/2009 |
| CN | 201750340 U | 2/2011 |

* cited by examiner

SWITCHING POWER SUPPLY WITH QUICK TRANSIENT RESPONSE

CROSS-REFERENCE TO RELATED APPLICATION(S)

This application is a National Phase Patent Application and claims priority to and benefit of International Application Number PCT/CN2010/078069, filed on Oct. 25, 2010, which claims priority to and benefit of Chinese Patent Application Number 201010248402.5, filed on Aug. 6, 2010, the entire disclosure of which are incorporated herein by reference.

BACKGROUND

1. Field

The present invention relates to a switching power supply with quick transient response against abrupt changes of load current, in particular to a switching power supply with variable output voltage and quick transient response, which is helpful for improving transient response rate of switching power supply, reducing fluctuation amplitude of output voltage, and reducing the time required for stabilizing the output voltage.

2. Description of the Related Art

Nowadays, as microprocessors and DSPs (Digital Signal Processors) develop, there is a demand for switching power supply with high current variation rate and quick transient response. In fact, microprocessors and DSPs are rapid-changing loads for switching power supply. For instance, to reduce power consumption, in idle state, microprocessors and DSPs enter into "Sleep Mode", in which the working current is very low; once needed, microprocessors and DSPs create instantaneous high current; thus, the switching power supply must have capability of quick transient response.

LnLC (Linear non-linear Control) is a method for improving the transient response rate for switching power supply, by adding a non-linear control loop on the basis of the existing linear control loop. When the load current is stable, the linear control loop of the switching power supply functions; once the load current changes abruptly and results in an output voltage variation beyond the limit, the non-linear control loop takes the place of the linear control loop and increases the transient response rate. Such a non-linear control loop requires two comparators to detect whether the output voltage is lower than the lower limit or higher than the upper limit. For a switching power supply unit with variable output voltage, additional circuits are required to produce limit which changes by following the output voltage, as a result of which, the circuit complexity and chip area are increased. A satisfactory transient response improving circuit must be capable of quickly stabilizing the output voltage, and preferably has simple structure and are less influenced by manufacturing technique and working environment.

SUMMARY

The present invention provides a switching power supply with quick transient response, which is helpful for improving the output voltage fluctuation amplitude and stabilization time of switching power supply.

The present invention employs the following technical scheme:

A switching power supply with quick transient response, comprising: a power stage with inductor, a PWM controller, and a grid signal drive circuit, wherein, a D/A (digital-to-analog) converter designed to produce a reference voltage is connected to a reference voltage input terminal of the PWM controller, an oscillator designed to produce clock signals is connected to a clock signal input terminal of the PWM controller, the output terminal of the power stage is connected to a voltage feedback signal input terminal of the PWM controller, which utilizes the output voltage of the switching power supply as the feedback signal, the PWM controller is designed to collect current signals of inductor in the power stage and take the collected current signal as the input signal for the current feedback signal input terminal of the PWM controller, an output terminal of the grid signal drive circuit is connected to an input terminal of the power stage, the other output terminal of the grid signal drive circuit is connected to the other input terminal of the power stage, and the output terminal of the power stage is used as the output terminal of the switching power supply; wherein, the switching power supply further includes a delay controller and a control signal gate, wherein, an output terminal of the control signal gate is connected to an input terminal of the grid signal drive circuit, the other output terminal of the control signal gate is connected to the other input terminal of the grid signal drive circuit, the reference voltage input terminal of the delay controller is connected to the reference voltage output terminal of the D/A converter, the clock signal input terminal of the delay controller is connected to the clock signal output terminal of the oscillator, the delay controller takes the output voltage from the switching power supply as its input voltage and input it into the voltage signal input terminal of the delay controller, the delay controller is designed to detect the output voltage of the switching power supply and compare the output voltage with the reference voltage; if the output voltage from the switching power supply is within the preset delay voltage range, the output terminal $SEL_p$ and output terminal $SEL_n$ of the delay controller will be both in low potential, and the control signal gate select the output signal $Q_{p1}$ and output signal $Q_{n1}$ from the PWM controller as the input signals for the grid signal drive circuit, the delay voltage range is the reference voltage±(10~30 mV); if the output voltage fluctuation amplitude of the switching power supply goes beyond the preset delay voltage range, the output terminal $SEL_p$ or output terminal $SEL_n$ of the delay controller will output high potential, and the control signal gate will select the output signal $Q_{p2}$ and output signal $Q_{n2}$ from the delay controller as the input signals for the grid signal drive circuit.

Advantages and Notable Effects of the Invention

The present invention improves the transient response capability of switching power supply by adding an additional delay controller on the existing PWM controller of the switching power supply. When the load current of the switching power supply changes abruptly and the output voltage fluctuates and goes beyond the delay voltage range, the delay controller will take the place of the PWM controller and functions.

If the output voltage is too high, the delay controller will switch off the P-MOS tube (P type power MOS tube) and switch on the N-MOS tube (N type MOS tube), so that the output filter capacitor discharges and thereby the output voltage is decreased. After the delay control loop operates for one or two PWM oscillation cycles, the switching power supply will automatically switch to be controlled by the PWM controller, while the delay controller still detects whether the output voltage is within the delay voltage range; if the output voltage goes beyond the delay voltage range again, the switching power supply will switch to be controlled by the delay controller again, till the output voltage is stabilized.

If the output voltage is too low, the delay controller will switch on the P-MOS tube and switch off the N-MOS tube, so that the output filter capacitor is charged, and thereby the output voltage is increased. After the delay controller operates for one or two PWM oscillation cycles, the switching power supply will automatically switch to be controlled by the PWM controller, while the delay controller still detects whether the output voltage is within the delay voltage range; if the output voltage goes beyond the delay voltage range again, the switching power supply will switch to be controlled by the delay controller again, till the output voltage is stabilized.

The new added delay controller only operates when the output voltage fluctuation amplitude goes beyond the delay voltage range, and therefore has no influence on other features of the switching power supply. In addition, the output voltage of the switching power supply provided in the present invention is variable, and the transient response rate against load current fluctuations can be effectively improved at different output voltage.

DETAILED DESCRIPTION

Figure 1:
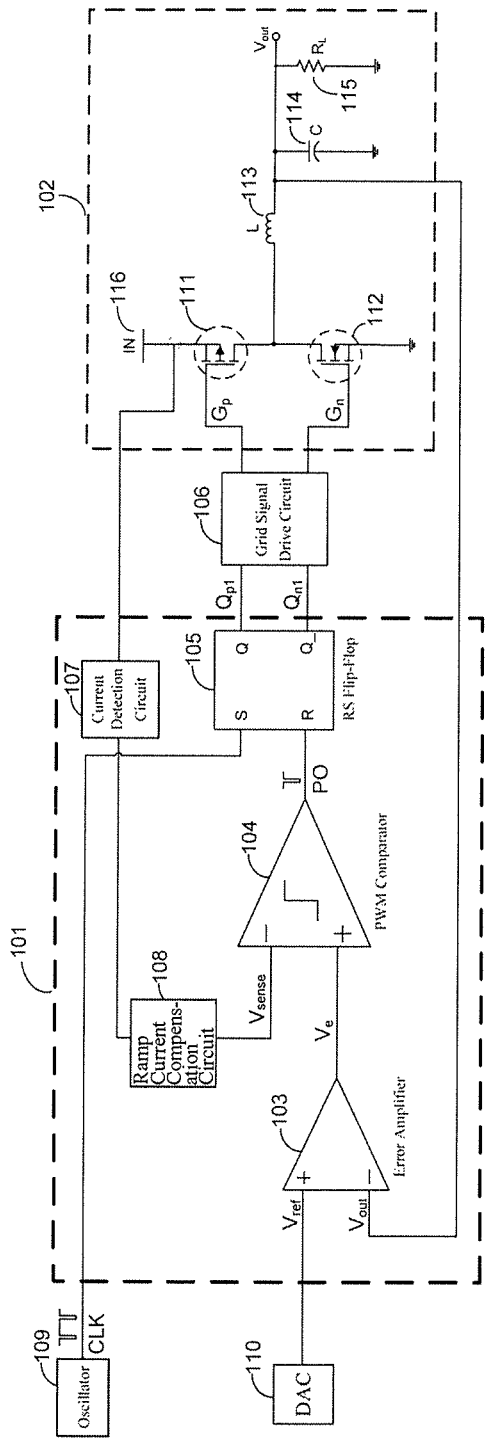
FIG. 1 is a circuit block diagram of a switching power supply with variable output voltage, which includes a power stage, a PWM controller, and a grid signal drive circuit.

A switching power supply with quick transient response, comprising: a power stage 102 with an inductor 113, a PWM controller 101, and a grid signal drive circuit 106, wherein, a D/A converter 110 designed to produce a reference voltage is connected to a reference voltage input terminal of the PWM controller 101, an oscillator 109 designed to produce clock signals is connected to a clock signal input terminal of the PWM controller 101, the output terminal of the power stage 102 is connected to a voltage feedback signal input terminal of the PWM controller 101 which utilizes the output voltage from the switching power supply as the feedback signal, the PWM controller 101 is designed to collect the current signal of the inductor 113 in the power stage 102 and take the collected current signal as the input signal for the current feedback signal input terminal of the PWM controller 101, an output terminal of the grid signal drive circuit 106 is connected to an input terminal of the power stage 102, the other output terminal of the grid signal drive circuit 106 is connected to the other input terminal of the power stage 102, and the output terminal of the power stage 102 is used as the output terminal of the switching power supply; wherein, the switching power supply further includes a delay controller 117 and a control signal gate 116, wherein, an output terminal of the control signal gate 116 is connected to an input terminal of the grid signal drive circuit 106, the other output terminal of the control signal gate 116 is connected to the other input terminal of the grid signal drive circuit 106, the reference voltage input terminal of the delay controller 117 is connected to the reference voltage output terminal of the D/A converter 110, the clock signal input terminal of the delay controller 117 is connected to the clock signal output terminal of the oscillator 109, the delay controller 117 takes the output voltage from the switching power supply as its input voltage and input into the voltage signal input terminal of the delay controller 117, the delay controller 117 is designed to detect the output voltage value of the switching power supply and compare it with the reference voltage; if the output voltage from the switching power supply is within a preset delay voltage range, the output terminal $SEL_p$ and output terminal $SEL_n$ of the delay controller 117 will be both in low potential, and the control signal gate 116 will select the output signal $Q_{p1}$ and output signal $Q_{n1}$ from the PWM controller 101 as the input signals for the grid signal drive circuit 106, the delay voltage range is the reference voltage±(10~30 mV); if the output voltage fluctuation amplitude of the switching power supply goes beyond the preset delay voltage range, the output terminal $SEL_p$ or output terminal $SEL_n$ of the delay controller 117 will output high potential, and the control signal gate 116 will select the output signal $Q_{p2}$ and output signal $Q_{n2}$ from the delay controller as the input signals for the grid signal drive circuit 106.

The delay controller 117 comprises a delay comparator 401, a first inverter 402, a timer circuit 403, a rising edge detection circuit 408, and a falling edge detection circuit 409, wherein, the output terminal of the switching power supply is connected to the negative phase input terminal of the delay comparator 401, the output terminal of the D/A converter (DAC) 110 is connected to the positive phase input terminal of the delay comparator 401, the output terminal of the delay comparator 401 is connected to the input terminal of the first inverter 402, an input terminal of the rising edge detection circuit 408, and an input terminal of the falling edge detection circuit 409 respectively, and is used as the output terminal $Q_{p2}$ of the delay controller 117, the output terminal of the first inverter 402 is used as the output terminal $Q_{n2}$ of the delay controller 117, the other two input terminals of the rising edge detection circuit 408 are connected to the output terminal Reset and enable terminal EN of the timer circuit 403, an output terminal $Pulse_p$ of the rising edge detection circuit 408 is connected to an input terminal of the timer circuit 403, the other output terminal of the rising edge detection circuit 408 is used as the output terminal $SEL_p$ of the delay controller 117, the other two input terminals of the falling edge detection circuit 409 are connected to the output terminal Reset and enable terminal EN of the timer circuit 403 respectively, the output terminal Pulse of the falling edge detection circuit 409 is connected to the other input terminal of the timer circuit 403, and the other output terminal of the falling edge detection circuit 409 is used as the output terminal $SEL_n$ of the delay controller 117, the clock signal input terminal and enable signal input terminal of the timer circuit 403 are used as the clock signal input terminal and enable signal input terminal of the delay controller 117 respectively.

The control signal gate 116 comprises a first gate 801, a second gate 802, a third gate 803, a fourth gate 804, a first NOR gate 805, a second NOR gate 807, a second inverter 806, and a third inverter 808. The output terminal $SE_n$ of the delay controller 117 is connected to an input terminal SEL of the third gate 803 and an input terminal SEL of the fourth gate 804 respectively, the other output terminal $SEL_p$ of the delay controller 117 is connected to an input terminal SEL of the first gate 801 and an input terminal SEL of the second gate 802 respectively, the output terminal $Q_{p1}$ of the PWM controller 101 is connected to the other input terminal IN1 of the second gate 802 and the other input terminal IN1 of the fourth gate 804 respectively, the other output terminal $Q_{n1}$ of the PWM controller 101 is connected to the other input terminal IN1 of the first gate 801 and the other input terminal IN1 of the third gate 803 respectively, the other output terminal $Q_{p2}$ of the delay controller 117 is connected to the other input terminal IN2 of the second gate 802 and the other input terminal IN2 of the fourth gate 804 respectively, the other output terminal $Q_{p2}$ of the delay controller 117 is connected to the other input terminal IN2 of the first gate 801 and the other input terminal IN2 of the third gate 803 respectively. The output terminals of the first gate 801 and third gate 803 are connected to the two input terminals of the first NOR gate 805, the output terminal of the first NOR gate 805 is connected to the input terminal of the second inverter 806, the output terminal of the second inverter 806 is used as the output terminal $Q_n$ of the control signal gate 116, the output terminals of the second gate 802 and fourth gate 804 are connected to the two input terminals of the second NOR gate 807, the output terminal of the second NOR gate 807 is connected to the input terminal of the third inverter 808, and the output terminal of the third inverter 808 is used as the output terminal $Q_p$ of the control signal gate 116.

The delay comparator 401 comprises an operation amplifier 501, a comparator 502, and a first resistor 503, a second resistor 504, a third resistor 505, and a fourth resistor 506. The output terminal $V_{ref}$ of the D/A converter (DAC) 110 is connected to one end of the first resistor 503 and one end of the third resistor 505 respectively, the other end of first resistor 503 is connected to one end of the second resistor 504 and the positive phase input terminal of the operation amplifier 501, the other end of the second resistor 504 is connected to the output terminal of the comparator 502 and is used as the output terminal $Q_{p2}$ of the delay comparator, the other terminal of the third resistor 505 is connected to one end of the fourth resistor 506 and the negative phase input terminal of the operation amplifier 501, the other end of the fourth resistor 506 is connected to the output terminal of the operation amplifier 501 and the positive phase input terminal of the comparator 502, and the negative phase input terminal of the comparator 502 is connected to the output terminal $V_{out}$ of the switching power supply.

Said rising edge detection circuit 408 comprises a first inverter delay chain 601, a fourth inverter 602, a fifth inverter 612, a sixth inverter 614, a first NAND gate 603, a second NAND gate 611, a third NAND gate 613, a first D flip-flop 605, and a first power input 604. The output terminal $Q_{p2}$ of the delay comparator 401 is connected to the input terminal of the first inverter delay chain 601, an input terminal of the first NAND gate 603 and an input terminal of the third NAND gate 613 respectively, the output terminal of the first inverter delay chain 601 is connected to the input terminal of the fourth inverter 602, the output terminal of the fourth inverter 602 is connected to the other input terminal of the first NAND gate 603, the output terminal of the first NAND gate 603 is connected to the clock input terminal of the first D flip-flop 605 and is used as the output terminal $Pulse_p$ of the rising edge detection circuit 408; the output terminal Reset and enable terminal EN of the timer circuit 403 are connected to the two input terminals of the second NAND gate 611 respectively, the output terminal of the second NAND gate 611 is connected to the input terminal of the fifth inverter 612, the output terminal of the fifth inverter 612 is connected to the other input terminal of the third NAND gate 613, the output terminal of the third NAND gate 613 is connected to the input terminal of the sixth inverter 614, the output terminal of the sixth inverter 614 is connected to the enable input terminal of the first D flip-flop 605, the data input terminal of the first D flip-flop 605 is connected to the first power input 604, and the output terminal of the first D flip-flop 605 is used as the output terminal $SEL_p$ of the rising edge detection circuit 408.

Said falling edge detection circuit 409 comprises a second inverter delay chain 606, a seventh inverter 607, an eighth inverter 609, a third NOR gate 608, a fourth NOR gate 616, a fourth NAND gate 615, and a second D flip-flop 610. The output terminal $Q_{p2}$ of the delay comparator 401 is connected to the input terminal of the second inverter delay chain 606, an input terminal of the third NOR gate 608 and an input terminal of the fourth NOR gate 616 respectively, the output terminal of the second inverter delay chain 606 is connected to the input terminal of the seventh inverter 607, the output terminal of the seventh inverter 607 is connected to the other input terminal of the third NOR gate 608, the output terminal of the third NOR gate 608 is connected to the input terminal of the eighth inverter 609, the output terminal of the eighth inverter 609 is connected to the clock input terminal of the D flip-flop 610 and is used as the output terminal $Pulse_n$ of the falling edge detection circuit 409; the output terminal Reset and enable terminal EN of the timer circuit 403 are connected to the two input terminals of the fourth NAND gate 615 respectively, the output terminal of the fourth NAND gate 615 is connected to the other input terminal of the fourth NOR gate 616, the output terminal of the fourth NOR gate 616 is connected to the enable input terminal of the second D flip-flop 610, the data input terminal of the second D flip-flop 610 is connected to the first power input 604, and the output terminal of the second D flip-flop 610 is used as the output terminal $SEL_n$ of the falling edge detection circuit 409.

Said timer circuit 403 comprises a ninth inverter 701, a tenth inverter 709, an eleventh inverter 710, a fifth NAND gate 703, a fifth NOR gate 702, a third D flip-flop 705, a fourth D flip-flop 706, a fifth D flip-flop 707, a third inverter delay chain 708, and a second power input 704. The output terminal $Pulse_p$ of the rising edge detection circuit 408 and the output terminal $Pulse_n$ of the falling edge detection circuit 409 are connected to the two input terminals of the fifth NAND gate 703, the output terminal of the fifth NAND gate 703 is connected to the input terminal of the tenth inverter 709, and the output terminal of the tenth inverter 709 is connected to the clock input terminal of the third D flip-flop 705. The enable terminal EN is connected to the input terminal of the ninth inverter 701, the output terminal of the ninth inverter 701 is connected to an input terminal of the fifth NOR gate 702, the other input terminal of the fifth NOR gate 702 is connected to the output terminal of the third inverter delay chain 708, the output terminal of the fifth NOR gate 702 is connected to the enable input terminal of the third D flip-flop 705, the data input terminal of the third D flip-flop 705 is connected to the second power input 704, the output terminal of the third D flip-flop 705 is connected to the enable input terminals of the fourth D flip-flop 706 and fifth D flip-flop 707, the clock input terminal of the fourth D flip-flop 706 is connected to the output terminal CLK of the oscillator 109, the data input terminal of the fourth D flip-flop 706 is connected to the antiphase output terminal of the fourth D flip-flop 706 and the clock input terminal of the fifth D flip-flop 707 respectively, the data input terminal of the fifth D flip-flop 707 is connected to the antiphase output terminal of the fifth D flip-flop 707, the positive phase output terminal of the fifth D flip-flop 707 is connected to the input terminal of the eleventh inverter 710 and the input terminal of the third inverter delay chain 708 respectively, and the output terminal of the eleventh inverter 710 is used as the output terminal Reset of the timer circuit 403.

Said PWM controller 101 comprises an error amplifier 103, a PWM comparator 104, a RS flip-flop 105, a current detection circuit 107, and a ramp current compensation circuit 108. The positive phase input terminal of the error amplifier 103 is used as the reference voltage input terminal of the PWM controller 101, the negative phase input terminal of the error amplifier 103 is used as the voltage feedback signal input terminal of the PWM controller 101, the output terminal $V_e$ of the error amplifier 103 is connected to the positive phase input terminal of the PWM comparator 104, the input terminal of the current detection circuit 107 is used as the current feedback signal input terminal of the PWM controller 101, the output terminal of the current detection circuit 107 is connected to the input terminal of the ramp current compensation circuit 108, the output terminal $V_{sense}$ of the ramp current compensation circuit 108 is connected to the negative phase input terminal of the PWM comparator 104, the output terminal PO of the PWM comparator 104 is connected to the reset input terminal R of the RS flip-flop 105, the set input terminal S of the RS flip-flop 105 is used as the clock input terminal of the PWM controller 101, the positive phase output terminal and negative phase output terminal of the RS flip-flop 105 are used as the output terminal $Q_{p1}$ and $Q_{n1}$ of the PWM controller 101 respectively.

Said power stage 102 comprises a P-MOS tube 111, an N-MOS tube 112, a filter inductor 113, a filter capacitor 114, a load resistor 115, and a third power input 116. The grid of the P-MOS tube 111 is used as an input terminal $G_p$ of the power stage 102, the grid of the N-MOS tube 112 is used as the other input terminal $G_n$ of the power stage 102, the source electrode of the P-MOS tube 111 is connected to the third power input 116, the drain electrode of the P-MOS tube 111 is connected to the drain electrode of the N-MOS tube 112 and one end of the filter inductor 113 respectively and is used as an inductive current feedback output terminal of the power stage 102, and the source electrode of the N-MOS tube 112 is connected to ground potential; the other end of the filter inductor 113 is connected to one end of the filter capacitor 114 and one end of the load resistor 115 respectively and is used as an output voltage feedback output terminal of switching power supply of the power stage 102, the other end of the filter capacitor 114 and the other end of the load resistor 115 are connected to ground potential.

The grid signal drive circuit 106 comprises a sixth NOR gate 301, a seventh NOR gate 307, a sixth NAND gate 302, a seventh NAND gate 308, a twelfth inverter 303, a thirteenth inverter 304, a fourteenth inverter 306, a fifteenth inverter 309, a first inverter drive chain 305, and a second inverter drive chain 310. An input terminal of the sixth NAND gate 302 is used as an input terminal of the grid signal drive circuit 106, the other input terminal of the sixth NAND gate 302 is connected to the output terminal of the sixth NOR gate 301, the output terminal of the sixth NAND gate 302 is connected to the input terminal of the twelfth inverter 303, the output terminal of the twelfth inverter 303 is connected to the input terminal of the thirteenth inverter 304 and an input terminal of the seventh NOR gate 307 respectively, the output terminal of the thirteenth inverter 304 is connected to the input terminal of the first inverter drive chain 305, the output terminal of the first inverter drive chain 305 is connected to the input terminal of the fourteenth inverter 306 and is used as the output terminal $G_p$ of the grid signal drive circuit 106, the output terminal of the fourteenth inverter 306 is connected to the other input terminal of the seventh NOR gate 307, the output terminal of the seventh NOR gate 307 is connected to an input terminal of the seventh NAND gate 308, the other input terminal of the seventh NAND gate 308 is used as the other input terminal of the grid signal drive circuit 106, the output terminal of the seventh NAND gate 308 is connected to the input terminal of the fifteenth inverter 309, the output terminal of the fifteenth inverter 309 is connected to the input terminal of the second inverter drive chain 310 and an input terminal of the sixth NOR gate 301 respectively, the output terminal of the second inverter drive chain 310 is connected to the other input terminal of the sixth NOR gate 301 and is used as the output terminal $G_n$ of the grid signal drive circuit 106.

Hereunder the embodiments of the present invention will be further detailed, with reference to the accompanying drawings:

As shown in FIG. 1, the PWM controller 101, grid signal drive circuit 106, power stage 102, oscillator 109, and DAC (D/A Converter) 110 form a step-down switching power supply, wherein, the PWM controller 101 comprises an error amplifier 103, a PWM comparator 104, a RS flip-flop 105, a current detection circuit 107, and a ramp current compensation circuit 108. The oscillator 109 provides clock signals for the PWM controller 101, the DAC 110 provides a reference voltage for the PWM controller, and DAC 110 produces variable reference voltage to regulate the output voltage of the switching power supply. The power stage 102 comprises a P-MOS tube 111, an N-MOS tube 112, a filter inductor 113, a filter capacitor 114, and a load resistor 115.

When the load current is constant, the output voltage of the switching power supply is stable, and the switching power supply operates in PWM mode. At the beginning of each operating cycle, the oscillator 109 is at low electrical level, so that the RS flip-flop 105 is set, output $Q_{p1}=1$ and $Q_{n1}=0$; $Q_{p1}$ and $Q_{n1}$ are input to the grid signal drive circuit 106, and grid signals $G_p=0$ and $G_n=0$ are produced, and thereby the P-MOS tube 111 is switched on and the N-MOS tube 112 is switched off; therefore, the current in the filter inductor 113 increases. The output voltage $V_{out}$ is fed back to the negative phase input terminal of the error amplifier 103, and therefore the difference between the output voltage $V_{out}$ and the output reference voltage $V_{ref}$ produced by the DAC 110 is amplified by the error amplifier 103, to obtain a control voltage $V_e$. At the same time, the current detection circuit 107 detects the current flow through the P-MOS tube 111; to suppress sub-harmonic oscillation, the ramp current compensation circuit 108 compensates the detected current to obtain a voltage $V_{sense}$. As the current in the P-MOS tube 111 increases, the voltage $V_{sense}$ increases; when the voltage $V_{sense}$ exceeds the control voltage $V_e$, the PWM comparator will output a low potential to reset the RS flip-flop 105, the outputs are $Q_{p1}=0$ and $Q_{n1}=1$; $Q_{p1}$ and $Q_{n1}$ are input to the grid signal drive circuit 106, and grid signals $G_p=1$ and $G_n=1$ are produced consequently, and thereby the P-MOS tube 111 is switched off, while the N-MOS tube 112 is switched on, so that the current in the filter inductor 113 decreases; at the beginning of the next operating cycle, above operating process will be repeated.

Figure 2:
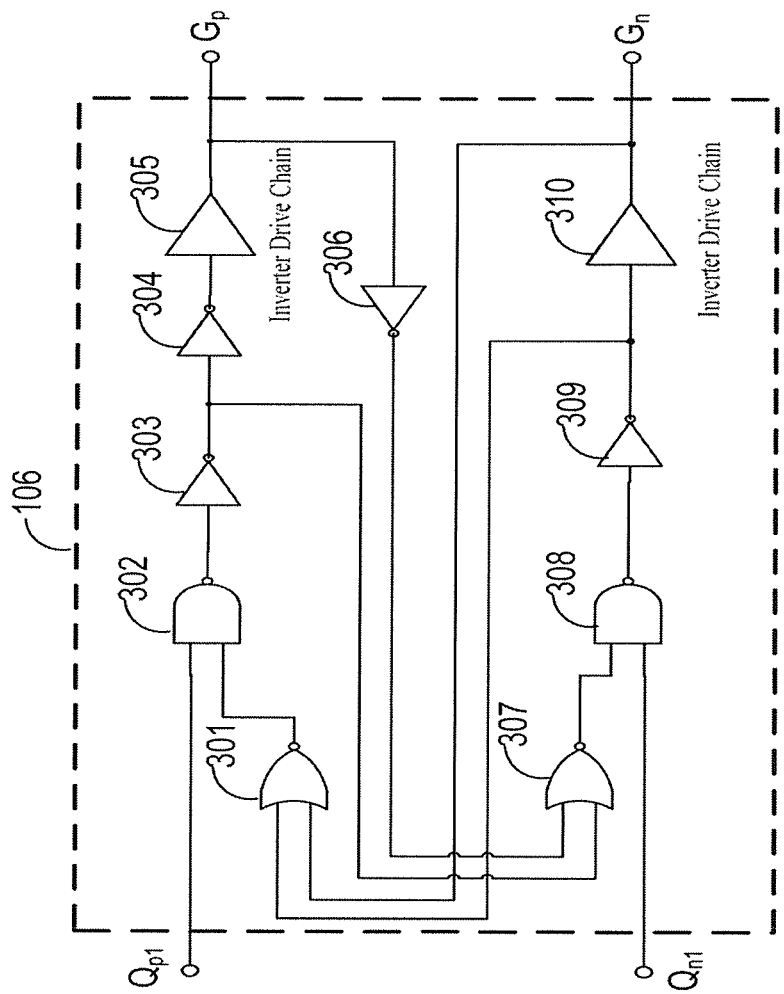
FIG. 2 is a detailed circuit block diagram of a grid signal drive circuit, which includes logic gate circuits and inverter drive chain circuits.
Figure 9:
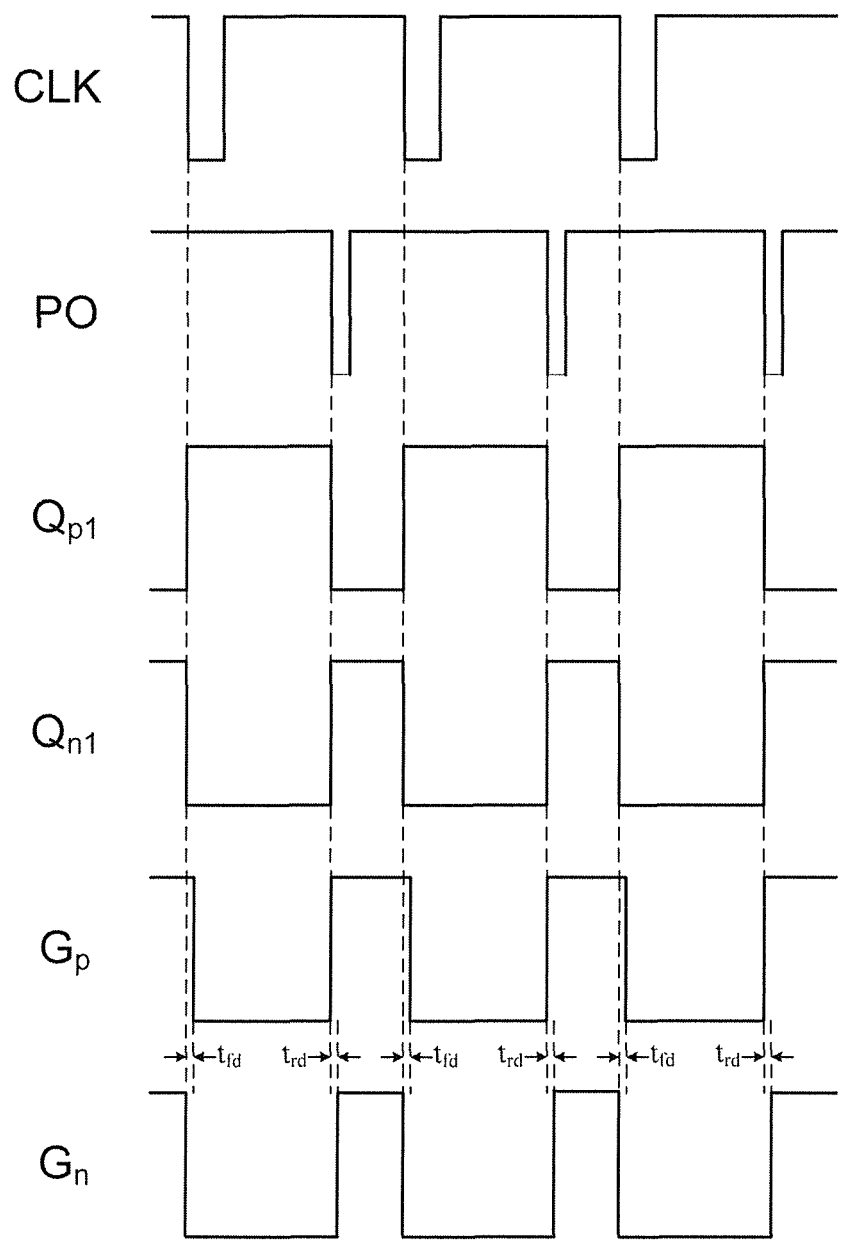
FIG. 9 shows the signal transmission oscillogram of the grid signal drive circuit.

FIG. 2 shows the grid signal drive circuit 106. Since the power MOS tube has very large size, the parasitic grid capacitance is big. To switch on or off the power MOS tubes quickly, a grid signal drive circuit 106 is required. In addition, the grid signal drive circuit 106 can also prevent the P-MOS tube 111 and N-MOS tube 112 from being switched on at the same time, and thereby prevent instantaneous high current that may result in reduced efficiency or destruction of power tubes. Two input NOR gates 301 and 307 are utilized as enable circuits of grid signal for the MOS tubes. As shown in FIG. 9, in PWM mode, before an operating cycle ends, $Q_{p1}=0$, $Q_{n1}=1$, and $G_p=1$, $G_n=0$, and the P-MOS tube is switched off, while the N-MOS tube is switched on; at the beginning of the next operating cycle, the oscillator 109 sets the RS flip-flop 105, so that $Q_{p1}=1$ and $Q_{n1}=0$; before $G_n$ changes to the low electrical level, the output of the NOR gate 301 is still 0, and therefore the $Q_{p1}$ signal is masked and has no influence on $G_p$; as a result, the P-MOS tube can be switched on only after the N-MOS tube is switched off, and the dead time $t_{fd}$ therebetween is decided by the logic gates 302, 303, 304 and the delay time $t_{fd}$ of the inverter drive chain 305. Likewise, when the PWM comparator 104 resets the RS flip-flop 105, i.e., $Q_{p1}=0$, $Q_{n1}=1$, before $G_p$ changes into high electrical level, the output of the NOR gate 307 is still 0; therefore, the $Q_{n1}$ signal is masked and has no influence on $G_n$, i.e. the N-MOS tube can be switched on only after the P-MOS tube is switched off, and the dead time $t_{rd}$ therebetween is decided by the logic gates 308, 309, and the delay time $t_{rd}$ of the inverter drive chain 310.

When an abrupt change of load current occurs, the output voltage $V_{out}$ fluctuates, and is fed back to the error amplifier 103, and therefore the output $V_e$ of the error amplifier 103 fluctuates; likewise, the abrupt change of load current results in output variation of the current detection circuit 107, and thereby the voltage $V_{sense}$ obtained from the ramp current compensation circuit 108 changes. $V_{sense}$ is compared with the output $V_e$ of the error amplifier 103, and the obtained output signal is used to control the operation of RS flip-flop 105 and change the grid signals of the power MOS tubes after passing the grid signal drive circuit 106, so as to stabilize the output voltage. Since modules such as error amplifier, PWM comparator, current detection circuit and ramp current compensation circuit exist in the PWM control loop, the delay time is very long; in addition, under the influence of the minimum operation duty ratio, the produced output signals $Q_{p1}$ and $Q_{n1}$ can't regulate the output voltage timely; therefore, the output voltage fluctuation amplitude is very high, and the time required for stabilization is very long, i.e, the rate of load current transient response of the switching power supply is very slow.

Figure 3:
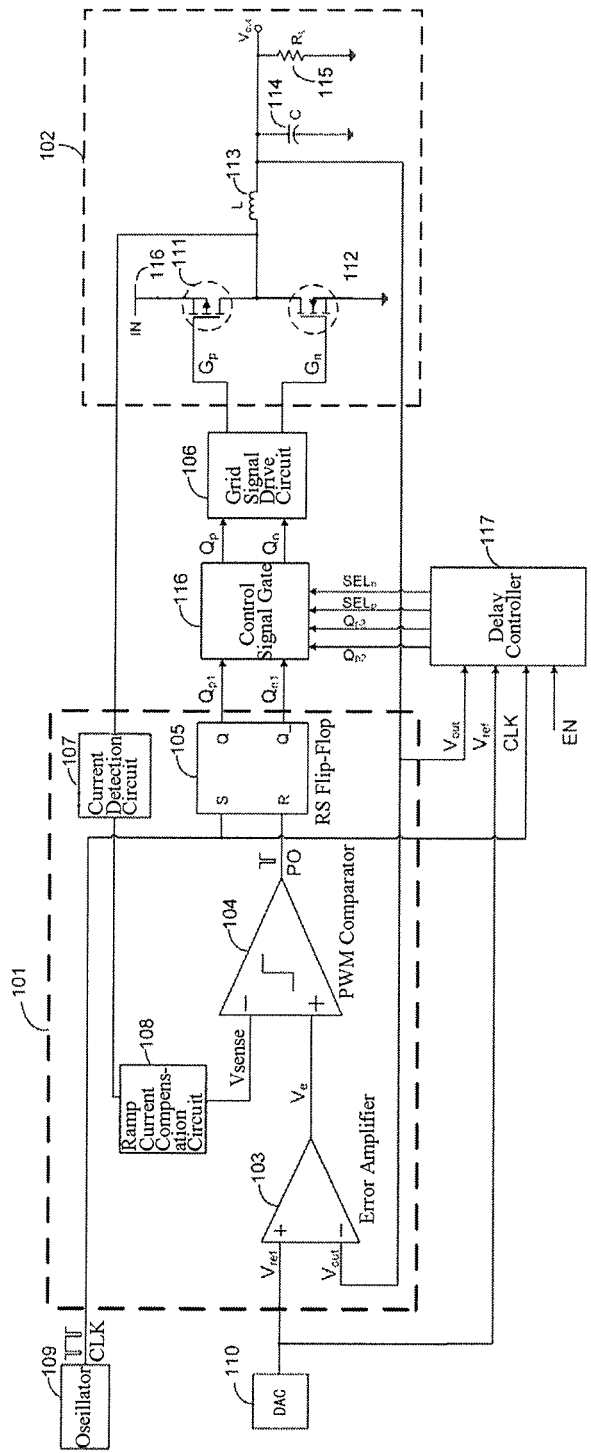
FIG. 3 is a circuit block diagram of a switching power supply with variable output voltage provided in the present invention, including a delay controller, a control signal gate, a power stage, a PWM controller, and a grid signal drive circuit.

The object of the present invention is to solve this problem. As shown in FIG. 3, a delay controller 117 and a control signal gate 116 are added on the basis of the existing PWM controller 101. The delay controller 117 detects the value of output voltage $V_{out}$, and compares the value with reference voltage $V_{Ref}$ directly. If the output voltage of the switching power supply is stable, the output terminals $SEL_p$ and $SEL_n$ of the delay controller 117 will be both at low potential, the output terminals $Q_p$ and $Q_n$ of the control signal gate 116 will be decided by the output signals $Q_{p1}$ and $Q_{n1}$ of the PWM controller 101, and the output signals $Q_{p2}$ and $Q_{n2}$ of the delay controller will be masked off; if the output voltage fluctuation amplitude of the switching power supply goes beyond the preset delay voltage range (10~30 mV), the output terminals $SEL_p$ or $SEL_n$ of the delay controller 117 will output high potential, the control signal gate 116 will function, and the output terminals $Q_p$ and $Q_n$ of the control signal gate 116 will be decided by the output signals $Q_{p2}$ and $Q_{n2}$ of the delay controller; therefore, the output signals $Q_{p1}$ and $Q_{n1}$ of the PWM controller 101 will be masked off. When the output voltage of the switching power supply is higher than the upper limit $V_H$ of the delay controller 117, $Q_{p2}$ will change from low potential to high potential, while $Q_{n2}$ will change from high potential to low potential, and $SEL_p$ will output high potential, while $SEL_n$ will output low potential; when the output voltage of the switching power supply is lower than the lower limit $V_L$ of the delay controller 117, $Q_{p2}$ will change from high potential to low potential, while $Q_{n2}$ will change from low potential to high potential, and $SEL_p$ will output low potential, while $SEL_n$ will output high potential. After the timer circuit 403 finishes operating, the signals $Sel_p$ and $Sel_n$ are reset to zero, and the control signal gate 116 transfers the output signals $Q_{p1}$ and $Q_{n1}$ of the PWM controller 101 to the grid signal drive circuit 106 again, and masks off the output signals $Q_{p2}$ and $Q_{n2}$ of the delay controller 117.

When an abrupt change of load current in positive direction occurs in the switching power supply, the output voltage $V_{out}$ will decrease. If the output voltage $V_{out}$ is lower than the lower limit $V_L$ of delay voltage, the delay controller 117 will function, and $Q_{p2}$ will flip to low potential; at the same time, the internal timer circuit thereof will operate, and $SEL_p=1$, so that the output terminals $Q_p$ and $Q_n$ of the control signal gate 116 will be decided by the output signals $Q_{p2}=0$ and $Q_{n2}=1$ of the delay controller, the grid signals $G_p=0$ and $G_n=0$ will be obtained via the grid signal drive circuit 106; therefore, the P-MOS tube will be switched on, while the N-MOS tube will be switched off, the output filter capacitor 114 will be charged, and the output voltage will increase; after the timer circuit finishes operating, $SEL_p$ and $SEL_n$ will be reset, the output terminals $Q_p$ and $Q_n$ of the control signal gate 116 will be decided by the output signals $Q_{p1}$ and $Q_{n1}$ of the PWM controller 101, and the switching power supply will operate in PWM mode; if the output voltage goes beyond the delay voltage range of the delay controller 117 again, the delay controller 117 will function again, and the above operating process will be repeated, till the output voltage is stabilized.

When an abrupt change of load current in negative direction occurs in the switching power supply, the output voltage $V_{out}$ will increase. If the output voltage $V_{out}$ is higher than the upper limit VH of delay voltage, the delay controller 117 will function, and $Q_{p2}$ will flip to high potential; at the same time, the internal timer circuit thereof 117 will operate, and $SEL_n=1$, so that the output terminals $Q_p$ and $Q_n$ of the control signal gate 116 will be decided by the output signals $Q_{p2}=1$ and $Q_{n2}=0$ of the delay controller, the grid signals $G_p=1$ and $G_n=1$ will be obtained via the grid signal drive circuit 106; therefore, the P-MOS tube will be switched off, while the N-MOS tube will be switched on, the output filter capacitor 114 will discharge, and the output voltage will decrease; after the timer circuit finishes operating, $SEL_p$ and $SEL_n$ will be reset, the output terminals $Q_p$ and $Q_n$ of the control signal gate 116 will be decided by the output signals $Q_{p1}$ and $Q_{n1}$ of the PWM controller 101, and the switching power supply will operate in PWM mode; if the output voltage goes beyond the delay voltage range of the delay controller 117 again, the delay controller 117 will function again, and the above operating process will be repeated, till the output voltage is stabilized.

Figure 4:
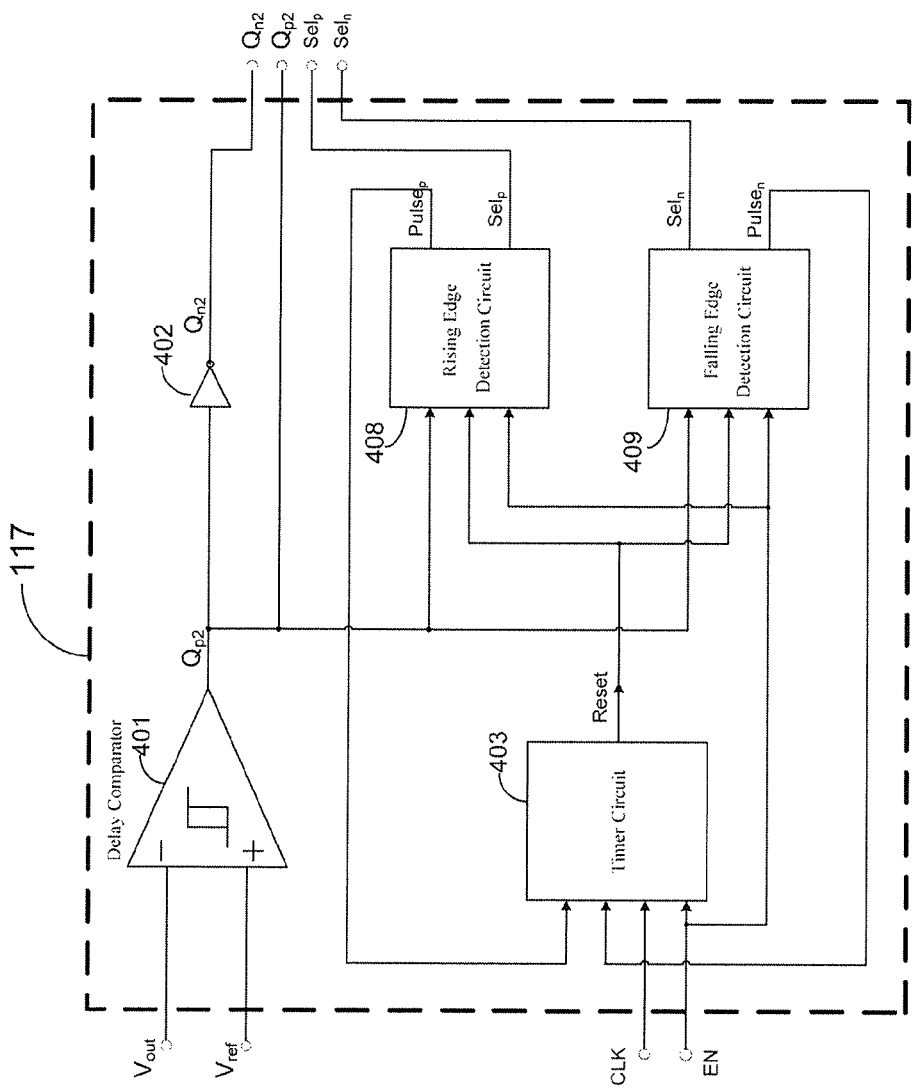
FIG. 4 is a detailed circuit block diagram provided in the present invention, including a delay comparator, edge detection circuits, a timer circuit, logic gate circuits, and a control signal gate.

A circuit block diagram of the delay controller 117 is shown in FIG. 4. The delay controller 117 is designed to detect the comparative relation between the output voltage $V_{out}$ and the output reference voltage $V_{ref}$, wherein, the two output signals $SEL_p$ and $SEL_n$ have influence on the operation of the control signal gate 116; when $SEL_p$ or $SEL_n$ is at high potential, the control signal gate 116 will transfer the other two output signals $Q_{p2}$ and $Q_{n2}$ of the delay controller 117 to the grid signal drive circuit 106 to change the grid signals of the power MOS tubes; in addition, the delay controller 117 has a operation timing function; when the timing ends, the control signal gate 116 will transfer the output signals $Q_{p1}$ and $Q_{n1}$ of the PWM controller 101 to the grid signal drive circuit 106. As shown in the circuit block diagram of delay controller 117 in FIG. 3, the delay controller 117 includes a delay comparator 401, a rising edge detection circuit 408, a falling edge detection circuit 409, a timer circuit 403, and an inverter 402. The delay comparator 401 detects the output voltage $V_{out}$; when the output voltage $V_{out}$ goes beyond the delay voltage range, the output $Q_{p2}$ and $Q_{n2}$ of the delay comparator 401 will flip; when the flipping event of the output signals of the delay comparator 401 is captured by the rising edge detection circuit 408 or falling edge detection circuit 409, $SEL_p$ or $SEL_n$ will be set to high potential, and the control signal gate 116 will transfer the control signals $Q_{p2}$ and $Q_{n2}$ of the delay controller 117 to the grid signal drive circuit 106; at the same time, the timer circuit 403 begins to work; after the timer circuit 403 stops operating, the output $SEL_p$ or $SEL_n$ of the edge detection circuits 408 and 409 will be reset, and the control signal gate 116 will transfer the control signals $Q_{p1}$ and $Q_{n1}$ of the PWM controller 101 to the grid signal drive circuit 106. EN is enable signal for the edge detection circuits 408, 409 and timer circuit 403. EN controls the operating state of the delay controller 117; if EN signal is 0, the delay controller 117 will only detects the output voltage but will not affect the operation of the control signal gate 116, and the output of the control signal gate 116 is completely decided by the output signals $Q_{p1}$ and $Q_{n1}$ of the PWM controller 101; if En signal is 1, the delay controller 117 will operate normally; when the output voltage fluctuation amplitude beyond the delay voltage range is detected, the output of the control signal gate 116 will be affected.

Figure 5:
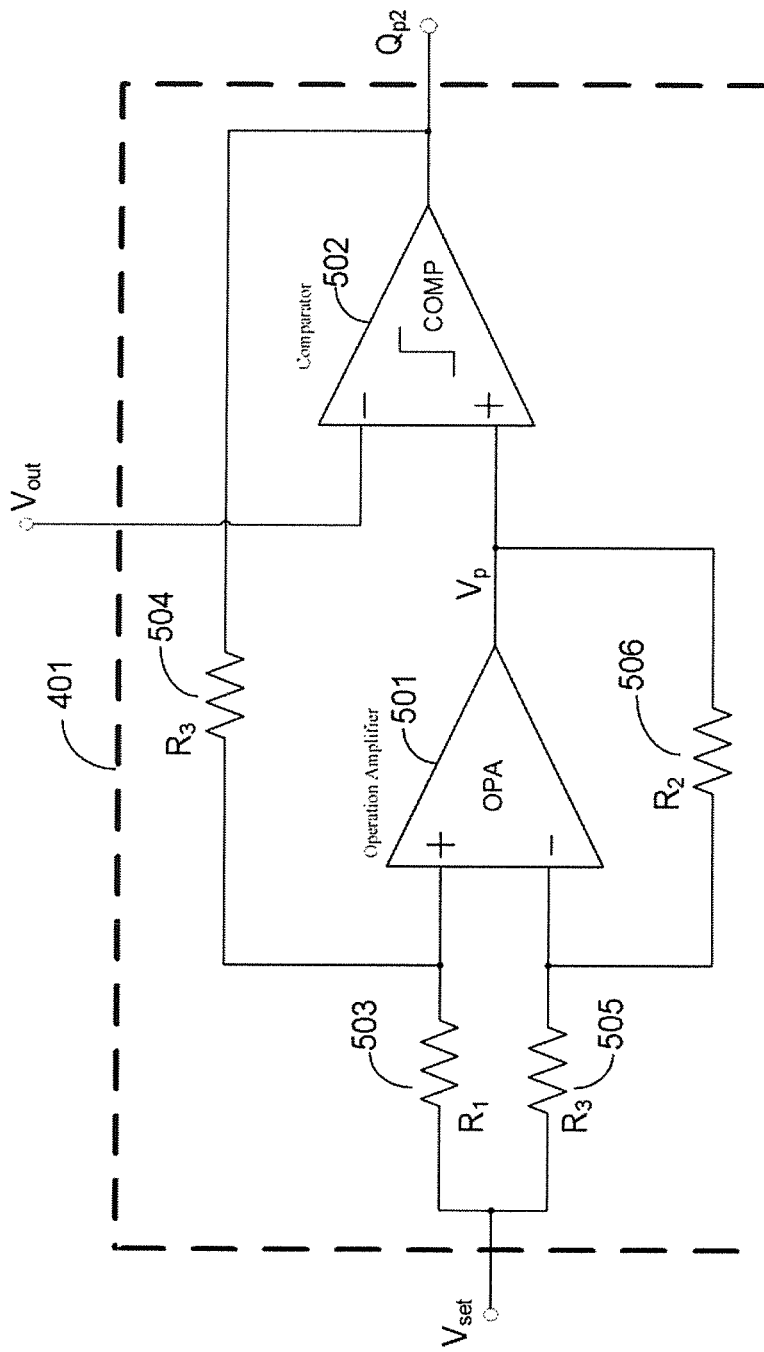
FIG. 5 is a circuit diagram of the delay comparator, which has variable center comparison voltage and determined delay voltage range.

Since the output voltage $V_{out}$ can be regulated by the DAC 110, the delay comparator 401 must have a wide input voltage range, and the center voltage of the delay comparator 401 can vary with the output reference voltage $V_{ref}$, while the delay voltage range remains constant. A detailed circuit block diagram of the delay comparator 401 is shown in FIG. 5. As shown in FIG. 5, the delay comparator 401 includes a rail-to-rail input range operation amplifier 501, a rail-to-rail input range comparator 502, and four resistors. If the direct current gain of the operation amplifier 501 is very high, the input terminals in positive direction and negative direction of the operation amplifier 501 have virtual short and virtual open characteristics. Then, the value of output $V_p$ of the operation amplifier 501 can be calculated as follows:

$$V_p = \frac{(R_2 + R_3)R_1}{(R_1 + R_3)R_3}(Q_{p2} - V_{ref}) + V_{ref}$$

Where, $Q_{p2}$ is the output of the comparator 502, and its value is equal to ground potential or input power voltage VCC; then, the upper limit $V_H$, lower limit $V_L$, and delay voltage range $V_d$ of the delay comparator 401 can be obtained, as follows:

$$V_H = \frac{(R_2 + R_3)R_1}{(R_1 + R_3)R_3}(V_{CC} - V_{ref}) + V_{ref}$$

$$V_L = \left[1 - \frac{(R_2 + R_3)R_1}{(R_1 + R_3)R_3}\right]V_{ref}$$

$$V_d = V_H - V_L = \frac{(R_2 + R_3)R_1}{(R_1 + R_3)R_3}V_{CC}$$

Appropriate resistance values can be selected according to the above formulae and design indexes, to obtain an appropriate delay voltage range. For example, if $R_3=R_2$, $R_1=659R_2$, and VCC=3.3V, $\Delta V=10$ mV can be obtained through calculation. The center voltage $V_{center}$ of the delay comparator 401 is:

$$V_{center} = \frac{329}{330}V_{ref} + 5 \text{ mV} \approx V_{ref}$$

It is seen from above formula: the center voltage of the delay comparator 401 varies with the output reference voltage $V_{ref}$, while the delay voltage range remains constant essentially. When the output voltage $V_{out}$ is lower than the lower limit $V_L$ of the delay comparator 401, the output $Q_{p2}$ of the delay comparator 401 will flip from low potential to high potential, and be kept at high potential; when the output voltage $V_{out}$ is higher than the upper limit $V_H$ of the delay comparator 401, the output $Q_{p2}$ of the delay comparator 401 will flip from high potential to low potential, and be kept at low potential, unless the output voltage $V_{out}$ is lower than the lower limit $V_L$ of the delay comparator 401 again.

Figure 6:
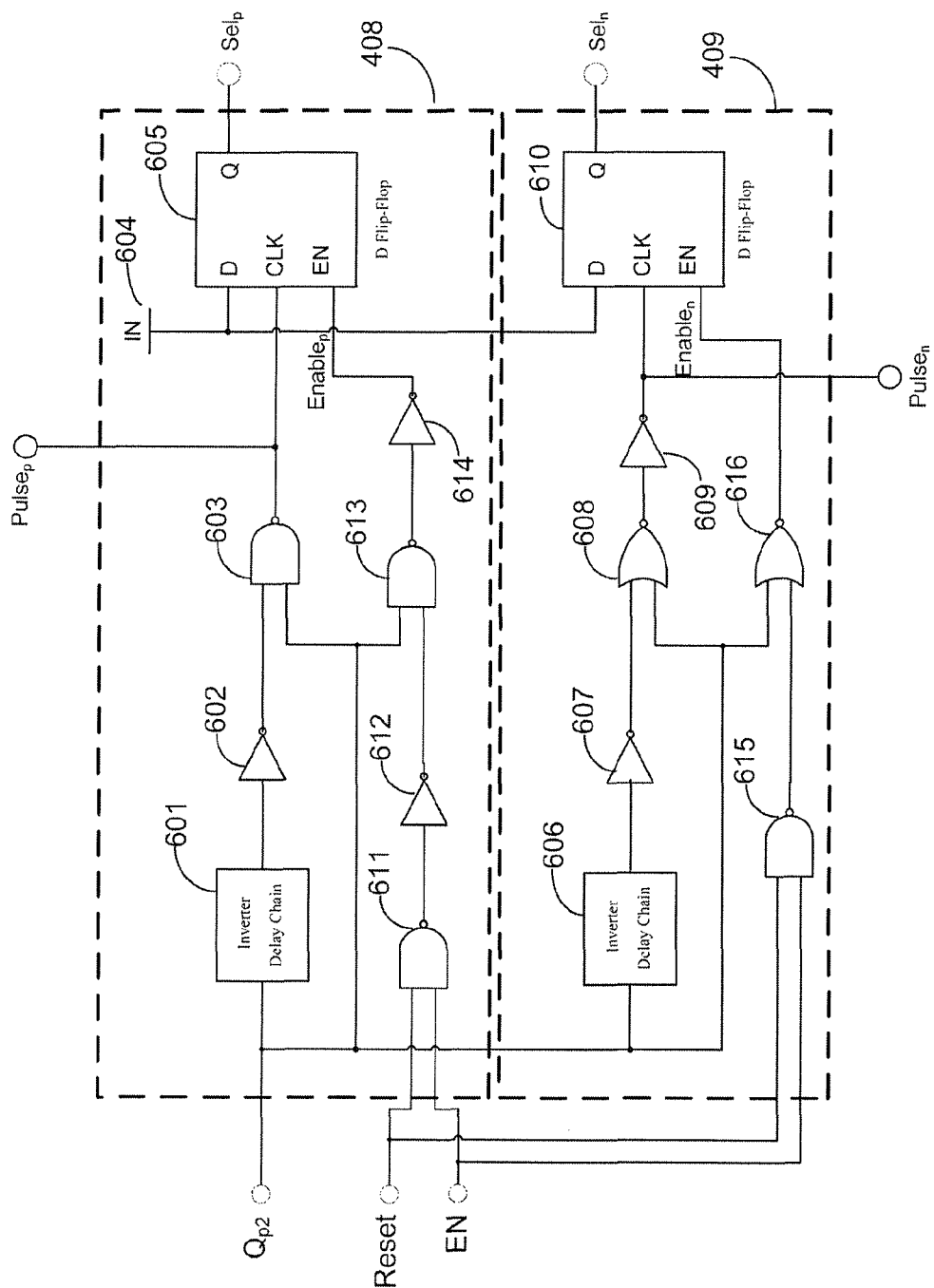
FIG. 6 shows an edge detection circuit, which is designed to detect jumps in the output of the delay comparator.

Since the relation between output voltage $V_{out}$ and output reference voltage $V_{ref}$ can be indicated directly only by the flipping of the output voltage of the delay comparator, edge detection circuits are required to ascertain the relation between output voltage $V_{out}$ and output reference voltage $V_{ref}$, and take corresponding actions. As shown in FIG. 6, the upper is a rising edge detection circuit 408, while the lower is a falling edge detection circuit 409, wherein, the rising edge detection circuit 408 includes an inverter delay chain 601, a D flip-flop 605, several logic gates, and an input power voltage terminal 604; the falling edge detection circuit 409 includes an inverter delay chain 606, a D flip-flop 610, several logic gates, and an input power voltage terminal 604. $Q_{p2}$ is the output terminal of the delay voltage comparator 401, EN is the enable signal for the delay controller 117, and Reset is the delay controller reset signal from the timer circuit 403.

When EN and Reset are at high potential, the edge detection circuits 408 and 409 are both in enabled state. As shown in the oscillogram in FIG. 10, when the output voltage $V_{out}$ is higher than the upper limit $V_H$ of the delay voltage comparator 401, $Q_{p2}$ change from low potential to high potential; under the action of the inverter delay chain 601, the output terminal of the inverter 602 change into low potential from high potential after a delay time, and thereby the two-input NAND gates 603 output a negative pulse Pulse$_p$, which has a pulse width equal to the delay time $t_d$ of the inverter delay chain 601; the rising edge of the negative pulse triggers the D flip-flop 605 to output Sel$_p$ at high potential. When the output voltage V$_{out}$ is lower than the lower limit V$_L$ of the delay voltage comparator 401 and Q$_{p2}$ changes from high potential to low potential, under the action of the inverter delay chain 606, the output terminal of the inverter 607 changes into high potential from low potential after a delay time, and thereby at the output terminal of the two-input NOR gates 608 a positive pulse is produced in pulse width equal to the delay time $t_d$ of the inverter delay chain 606; the positive pulse is converted into a negative pulse Pulse$_n$ after passing the inverter 609, and the rising edge of the negative pulse triggers the D flip-flop 610 to output Sel$_n$ at high potential.

Figure 7:
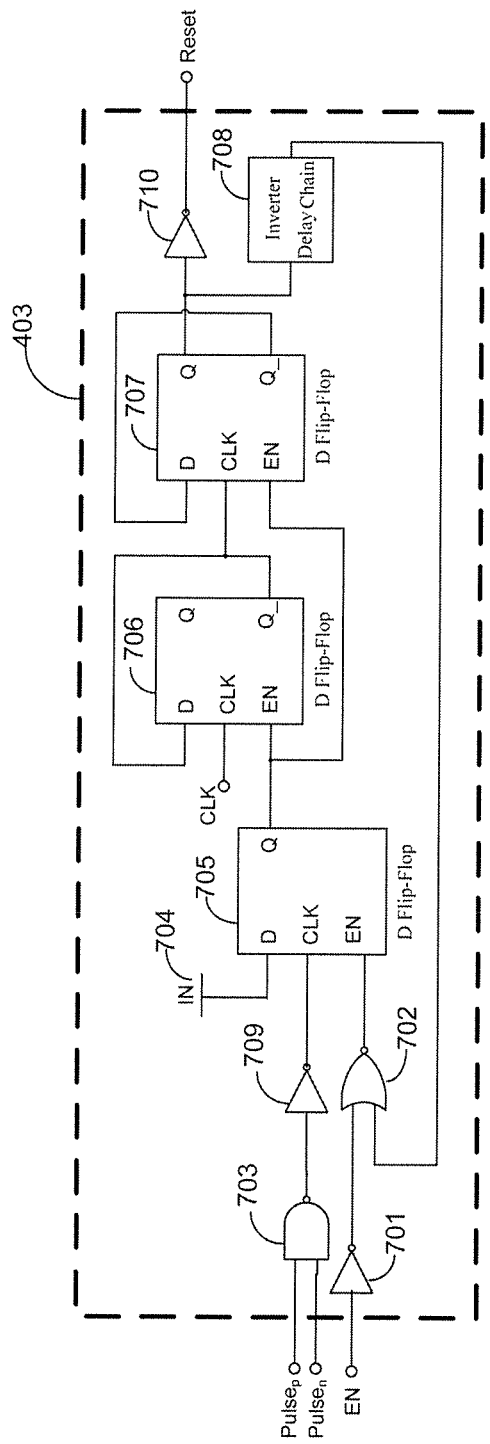
FIG. 7 shows the timer circuit, which is designed to control the operating time of the delay control loop.
Figure 10:
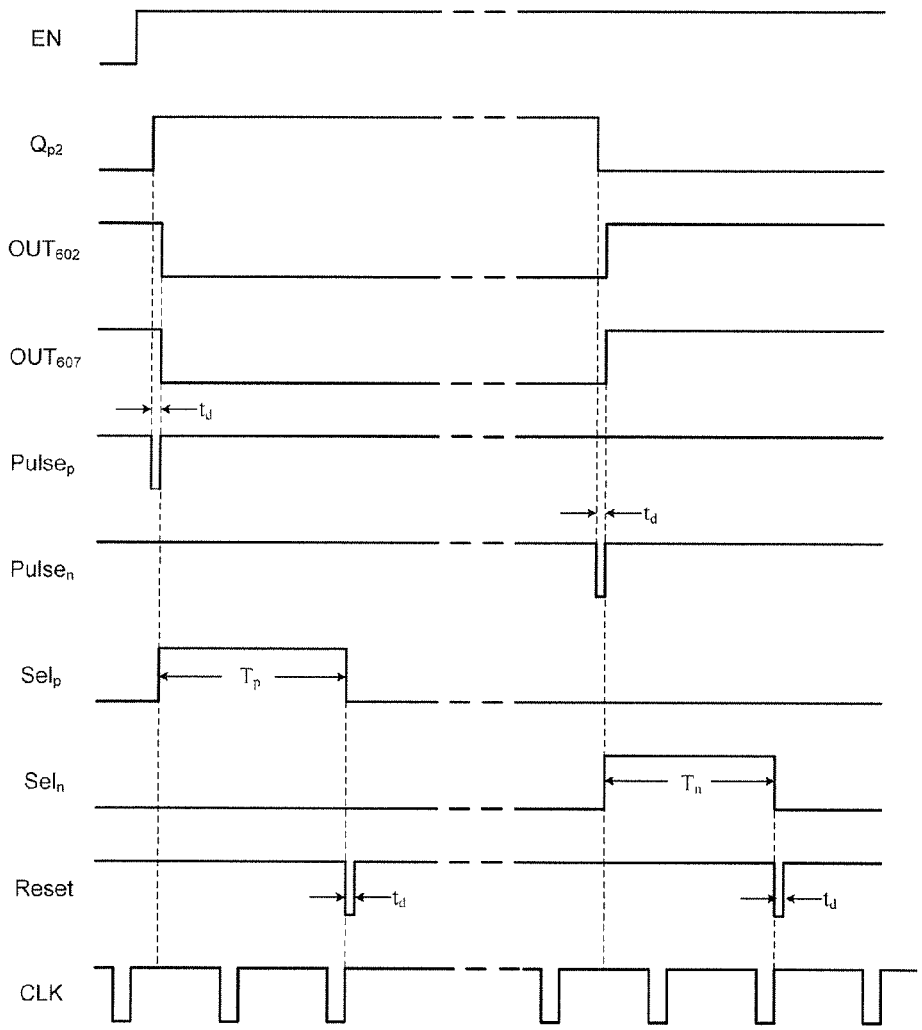
FIG. 10 shows the signal transmission oscillogram in the delay controller after output voltage fluctuation.

When the output signal Sel$_p$ or Sel$_n$ of the edge detection circuit 408 or 409 is set to high potential, the output of the control signal gate 116 will be changed, and thereby the control signal gate 116 will transfer the output signals Q$_{p2}$ and Q$_{n2}$ from the delay controller 117 and mask off the output signals Q$_{p1}$ and Q$_{n1}$ from the PWM controller 101. When the edge detection circuit 408 or 409 produces a negative pulse Pulse$_p$ or Pulse$_n$, the timer circuit 403 will start at the same time. When the timer circuit 403 stops working, the Sel$_p$ and Sel$_n$ will be reset to zero. Now, the control signal gate 116 will transfer the output signals Q$_{p1}$ and Q$_{n1}$ from the PWM controller 101 again, but masks off the output signals Q$_{p2}$ and Q$_{p2}$ from the delay controller 117. A circuit block diagram of the timer circuit 403 is shown in FIG. 7. When the EN signal is at high potential, the two-input NOR gate 702 outputs high potential, and the timer circuit is enabled. The clock input terminal signal of the D flip-flop 705 is decided by the output signals Pulse$_p$ and Pulse$_n$ of the edge detection circuits 408 and 409. When the rising edge detection circuit 408 or falling edge detection circuit 409 detects a rising edge or falling edge from the delay comparator 401, Pulse$_p$ or Pulse$_n$ will output negative pulse signal, the output terminal of the inverter 709 will produce negative pulse, and the rising edge of the negative pulse will make the output terminal of flip-flop 705 at high potential, and thereby the EN terminal of the D flip-flop 706 is enabled. The D flip-flops 706 and 707 are connected to form a fourth-frequency-dividing counting circuit, the clock input terminal signal of which is provided by the oscillator. After the clock signal CLK of the oscillator creates two rising edges, the fourth-frequency-dividing counting circuit composed of the D flip-flops 706 and 707 outputs 10, i.e., the output terminal Q of the D flip-flop 707 flips to high potential, and the output terminal Reset of the inverter 710 flips to low potential, so that the circuit of the delay controller 117 is reset; after the delay time $t_d$ of the inverter delay chain 708, the timer circuit 403 is also reset, and will not operate any more without the next triggering signal of Pulse$_p$ or Pulse$_n$. Therefore, the operating time of the delay controller 117 is decided by the timer circuit 403 as T$_p$ or T$_n$, as shown in FIG. 10.

Figure 8:
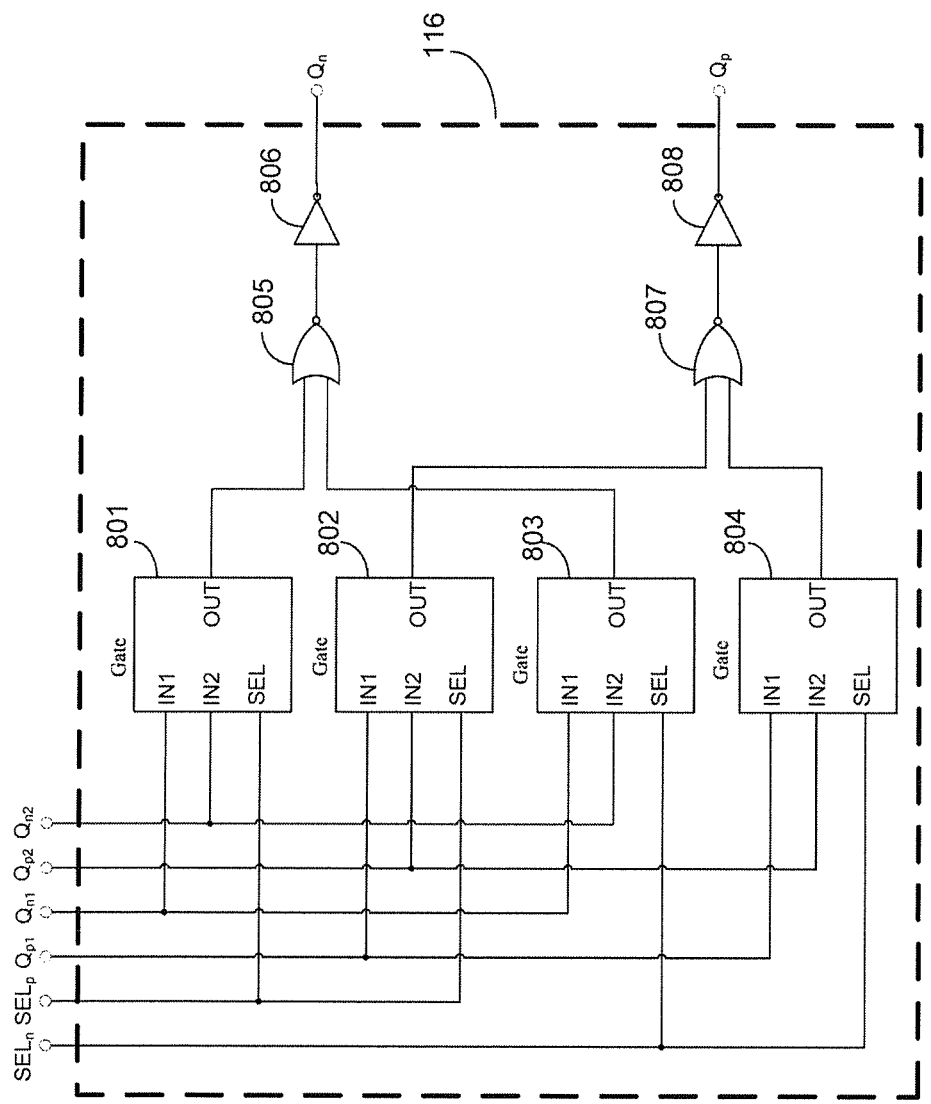
FIG. 8 shows the control signal gate, which is designed to select the control signal from the PWM controller or the control signal from the delay controller, and input the selected signal into the grid signal drive circuit, so as to decide the grid signal of the power MOS tube.

It is seen from above analysis: the output signals Q$_p$ and Q$_n$ of the control signal gate 116 are jointly decided by the output signals Q$_{p1}$ and Q$_{n1}$ of the PWM controller 101 and the output signals Q$_{p2}$ and Q$_{n2}$ of the delay controller 117. A circuit block diagram of the control signal gate 116 is shown in FIG. 8, wherein, the modules 801, 802, 803, and 804 are 2-to-1 gates. For these gates, Out=IN1 when SEL=0; Out=IN2 when SEL=1.

When the output voltage of the switching power supply is stable, SEL$_n$=SEL$_p$=0, for the output signals of the control signal gate 11, Q$_p$=Q$_{p1}$, Q$_n$=Q$_{n1}$, as are decided by the PWM controller 101.

Figure 11:
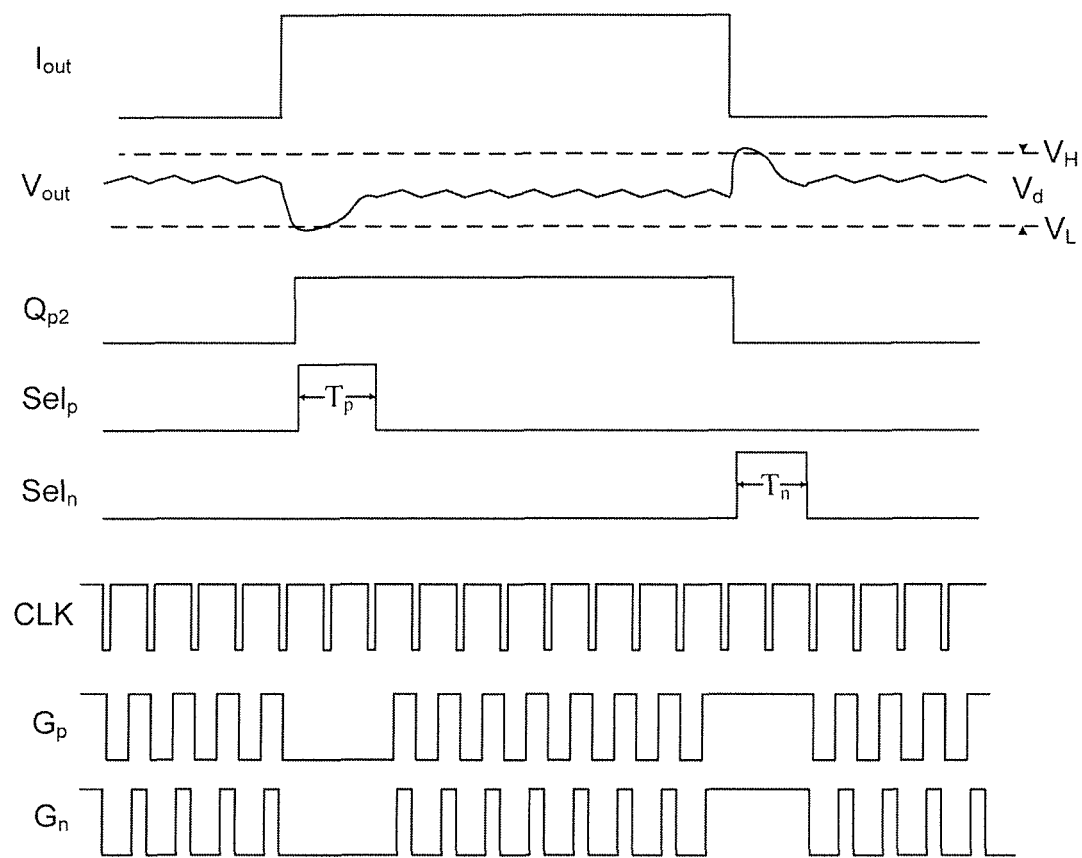
FIG. 11 shows the output voltage fluctuation and the grid signal oscillogram of the delay controller after an abrupt change of load current.

It is seen from above analysis: as shown in FIG. 11, when an abrupt change of load current I$_{out}$ in positive direction occurs in the switching power supply, the output voltage will decrease, the output of the delay comparator 401 will change from low potential to high electric potential, and Q$_{p2}$=1, Q$_{n2}$=0, the rising edge detection circuit 408 will output a signal SEL$_p$=1, while the falling edge detection circuit 409 will output a signal SEL$_n$=0; for the output signals passing the control signal gate 116, Q$_p$=1 and Q$_n$=Q$_{n1}$; after Q$_p$=1 is transferred through the grid signal drive circuit 116, the grid signal of the P-MOS tube 111 becomes G$_p$=0, and the grid signal of the N-MOS tube 112 becomes G$_n$=0; the power voltage will charge the output filter capacitor 114 via the P-MOS tube 111 and the inductor 113, and thereby the output voltage will increase. After the timing circuit 403 operates for a time T$_p$, the delay controller 117 is reset, SEL$_n$=SEL$_p$=0, and the output signals of the control signal gate 116 become Q$_p$=Q$_{p1}$, Q$_n$=Q$_{n1}$, as decided by the PWM controller 101.

When an abrupt change of load current I$_{out}$ in negative direction occurs in the switching power supply, the output voltage will increase, the output of the delay comparator 401 will change from high potential to low potential, and Q$_{p2}$=0, Q$_{n2}$=1, the rising edge detection circuit 408 will output a signal SEL$_p$=0, while the falling edge detection circuit 409 will output a signal SEL$_n$=1; the output signals become Q$_p$=Q$_{p1}$ and Q$_n$=1 after passing the control signal gate 116; when Q$_n$=1 is transferred through the grid signal drive circuit 116, the grid signal of the P-MOS tube 111 becomes G$_p$=1, and the grid signal of the N-MOS tube 112 becomes G$_n$=1; the output filter capacitor 114 will discharge via the N-MOS tube 112 and the inductor 113, and thereby the output voltage will decrease. After the timing circuit 403 operates for a time T$_n$, the delay controller 117 is reset, SEL$_n$=SEL$_p$=0, and the output signals of the control signal gate 116 become Q$_p$=Q$_{p1}$, Q$_n$=Q$_{n1}$, as decided by the PWM controller 101.

It is seen from above analysis: the transient response rate of the switching power supply in the present invention against abrupt changes of load current is improved. With the characteristics of delay controllers (without compensation, and short delay time), the PWM controller can be replaced by a delay controller to regulate the output voltage, suppress voltage fluctuation amplitude, and shorten the time required for stabilization, when abrupt changes of the load current occur and output voltage fluctuate.

For example, a peak current type BUCK switching power supply, with a control circuit block diagram as shown in FIG. 1; the switching frequency of the switching power supply is 2 MHz, the range of input voltage IN is 2.7V~3.5V, a 6-bit DAC is used to output reference voltage, the range of output voltage V$_{out}$ is 0.725V~1.8V, the step size is 25 mV, and the range of load current I$_{out}$ is 0~500 mA.

Figure 12:
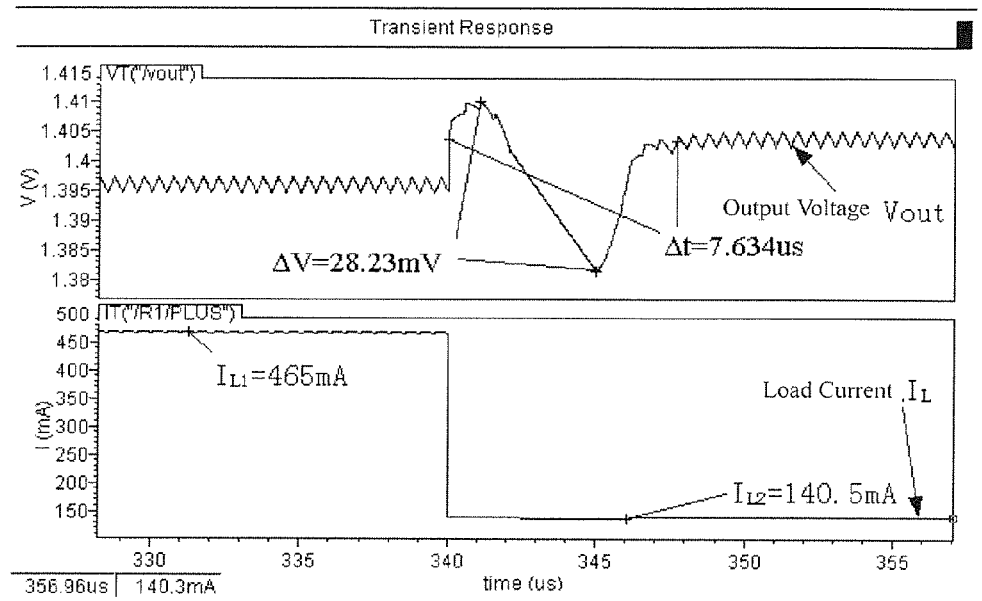
FIG. 12 shows the transient response of an existing switching power supply against abrupt changes of load current.

As shown in FIG. 12, when the input voltage IN is 3.3V and the output voltage V$_{out}$ is 1.4V, the load current I$_{out}$ change from 465 mA to 140.5 mA; against the abrupt change of load current, the switching power supply makes transient response, the output voltage fluctuation amplitude ΔV is 28.23 mV, and the stabilization time Δt is 7.634 us.

The present invention can be utilized to improve the transient response against load current in peak current type BUCK switching power supply, as shown in the circuit block diagram in FIG. 3. The delay voltage range of the delay comparator can be decided by setting the values of four resistors of the delay comparator. If R$_3$=R$_2$=1 KΩ, R$_1$=659R$_2$=659 KΩ, and VCC=3.3V, then the delay voltage range is V$_d$=10 mV.

Figure 13:
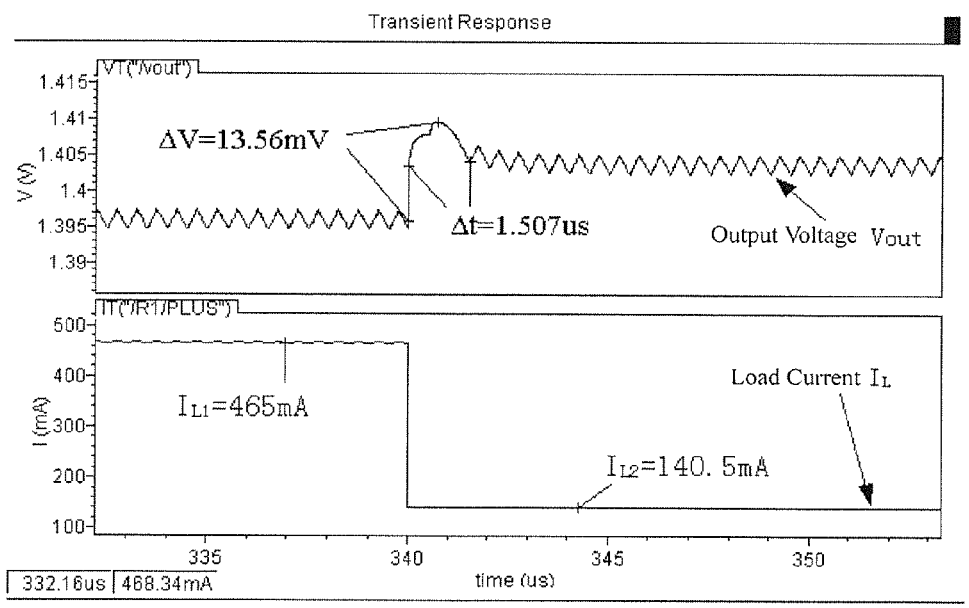
FIG. 13 shows the transient response of a switching power supply with a delay controller against abrupt changes of load current.

As shown in FIG. 13, when the input voltage IN is 3.3V and the output voltage V$_{out}$ is 1.4V, the load current I$_{out}$ changes from 465 mA to 140.5 mA; against the abrupt change of load current, the switching power supply provided in the present invention makes transient response, the output voltage fluctuation amplitude ΔV is 13.56 mV, and the stabilization time Δt is 1.507 us. Compared to the transient response of the existing switching power supply in the prior art, both the output voltage fluctuation amplitude and the stabilization time are greatly reduced.

What is claimed is:

1. A switching power supply with quick transient response, comprising:

a power stage (102) with an inductor (113), a PWM controller (101), and a grid signal drive circuit (106), a D/A converter (110) designed to produce a reference voltage is connected to a reference voltage input terminal of the PWM controller (101), an oscillator (109) designed to produce clock signals is connected to a clock signal input terminal of the PWM controller (101), the output terminal of the power stage (102) is connected to a voltage feedback signal input terminal of the PWM controller (101) which utilizes the output voltage from the switching power supply as the feedback signal, the PWM controller (101) is designed to collect the current signal of the inductor (113) in the power stage (102) and take the collected current signal as the input signal for the current feedback signal input terminal of the PWM controller (101), an output terminal of the grid signal drive circuit (106) is connected to an input terminal of the power stage (102), the other output terminal of the grid signal drive circuit (106) is connected to the other input terminal of the power stage (102), and the output terminal of the power stage (102) is used as the output terminal of the switching power supply;

wherein, the switching power supply further comprises a delay controller (117) and a control signal gate (116), an output terminal of the control signal gate (116) is connected to an input terminal of the grid signal drive circuit (106), the other output terminal of the control signal gate (116) is connected to the other input terminal of the grid signal drive circuit (106), the reference voltage input terminal of the delay controller (117) is connected to the reference voltage output terminal of the D/A converter (110), the clock signal input terminal of the delay controller (117) is connected to the clock signal output terminal of the oscillator (109), the delay controller (117) takes the output voltage from the switching power supply as its input voltage and input into the voltage signal input terminal of the delay controller (117), the delay controller (117) is designed to detect the value of the output voltage of the switching power supply and compare the output voltage with the reference voltage; if the output voltage from the switching power supply is within a preset delay voltage range, the output terminal ($SEL_p$) and output terminal ($SEL_n$) of the delay controller (117) will be both at low potential, and the control signal gate (116) will select the output signal ($Q_{p1}$) and output signal ($Q_{n1}$) from the PWM controller (101) as input signals for the grid signal drive circuit 106, the delay voltage range is the reference voltage±(10~30 mV); if the output voltage fluctuation amplitude of the switching power supply goes beyond the preset delay voltage range, the output terminal ($SEL_p$) or output terminal ($SEL_n$) of the delay controller (117) will output high potential, and the control signal gate (116) will select the output signal ($Q_{p2}$) and output signal ($Q_{n2}$) from the delay controller as the input signals for the grid signal drive circuit (106).

2. The switching power supply with quick transient response according to claim 1, wherein, the delay controller (117) comprises a delay comparator (401), a first inverter (402), a timer circuit (403), a rising edge detection circuit (408), and a falling edge detection circuit (409), the output terminal of the switching power supply is connected to the negative phase input terminal of the delay comparator (401), the output terminal of the D/A converter (DAC) (110) is connected to the positive phase input terminal of the delay comparator (401), the output terminal of the delay comparator (401) is connected to the input terminal of the first inverter (402), an input terminal of the rising edge detection circuit (408) and an input terminal of the falling edge detection circuit (409) respectively, and is used as the output terminal ($Q_{p2}$) of the delay controller (117), the output terminal of the first inverter (402) is used as the output terminal ($Q_{n2}$) of the delay controller (117), the other two input terminals of the rising edge detection circuit (408) are connected to the output terminal (Reset) and enable terminal (EN) of the timer circuit (403) respectively, an output terminal ($Pulse_p$) of the rising edge detection circuit (408) is connected to an input terminal of the timer circuit (403), the other output terminal of the rising edge detection circuit (408) is used as the output terminal ($SEL_p$) of the delay controller (117), the other two input terminals of the falling edge detection circuit (409) are connected to the output terminal (Reset) and enable terminal (EN) of the timer circuit (403) respectively, the output terminal ($Pulse_n$) of the falling edge detection circuit (409) is connected to the other input terminal of the timer circuit (403), and the other output terminal of the falling edge detection circuit (409) is used as the output terminal ($SEL_n$) of the delay controller (117), the clock signal input terminal and enable signal input terminal of the timer circuit (403) are used as the clock signal input terminal and enable signal input terminal of the delay controller (117) respectively.

3. The switching power supply with quick transient response according to claim 1, wherein, the control signal gate (116) comprises a first gate (801), a second gate (802), a third gate (803), a fourth gate (804), a first NOR gate (805), a second NOR gate (807), a second inverter (806), and a third inverter (808);

the output terminal ($SEL_n$) of the delay controller (117) is connected to an input terminal (SEL) of the third gate (803) and an input terminal (SEL) of the fourth gate (804) respectively, the other output terminal ($SEL_p$) of the delay controller (117) is connected to an input terminal (SEL) of the first gate (801) and an input terminal (SEL) of the second gate (802) respectively, the output terminal ($Q_{p1}$) of the PWM controller (101) is connected to the other input terminal (IN1) of the second gate (802) and the other input terminal (IN1) of the fourth gate (804) respectively, the other output terminal ($Q_{n1}$) of the PWM controller (101) is connected to the other input terminal (IN1) of the first gate (801) and the other input terminal (IN1) of the third gate (803) respectively, the other output terminal ($Q_{p2}$) of the delay controller (117) is connected to the other input terminal (IN2) of the second gate (802) and the other input terminal (IN2) of the fourth gate (804) respectively, the other output terminal ($Q_{n2}$) of the delay controller (117) is connected to the other input terminal (IN2) of the first gate (801) and the other input terminal (IN2) of the third gate (803) respectively; the output terminals of the first gate (801) and third gate (803) are connected to the two input terminals of the first NOR gate (805), the output terminal of the first NOR gate (805) is connected to the input terminal of the second inverter (806), the output terminal of the second inverter (806) is used as the output terminal ($Q_n$) of the control signal gate (116), the output terminals of the second gate (802) and fourth gate (804) are connected to the two input terminals of the second NOR gate (807), the output terminal of the second NOR gate (807) is connected to the input terminal of the third inverter (808), and the output terminal of the third inverter (808) is used as the output terminal ($Q_p$) of the control signal gate (116).

4. The switching power supply with quick transient response according to claim 2, wherein, the delay comparator (401) comprises an operation amplifier (501), a comparator (502), a first resistor (503), a second resistor (504), a third resistor (505), and a fourth resistor (506), the output terminal ($V_{ref}$) of the D/A converter (DAC) (110) is connected to one end of the first resistor (503) and one end of the third resistor (505) respectively, the other end of first resistor (503) is connected to one end of the second resistor (504) and the positive phase input terminal of the operation amplifier (501), the other end of the second resistor (504) is connected to the output terminal of the comparator (502) and is used as the output terminal ($Q_{p2}$) of the delay comparator, the other terminal of the third resistor (505) is connected to one end of the fourth resistor (506) and the negative phase input terminal of the operation amplifier (501), the other end of the fourth resistor (506) is connected to the output terminal of the operation amplifier (501) and the positive phase input terminal of the comparator (502), and the negative phase input terminal of the comparator (502) is connected to the output terminal ($V_{out}$) of the switching power supply.

5. The switching power supply with quick transient response according to claim 2, wherein, the rising edge detection circuit (408) comprises a first inverter delay chain (601), a fourth inverter (602), a fifth inverter (612), a sixth inverter (614), a first NAND gate (603), a second NAND gate (611), a third NAND gate (613), a first D flip-flop (605), and a first power input (604), the output terminal ($Q_{p2}$) of the delay comparator (401) is connected to the input terminal of the first inverter delay chain (601), an input terminal of the first NAND gate (603) and an input terminal of the third NAND gate (613) respectively, the output terminal of the first inverter delay chain (601) is connected to the input terminal of the fourth inverter (602), the output terminal of the fourth inverter (602) is connected to the other input terminal of the first NAND gate (603), the output terminal of the first NAND gate (603) is connected to the clock input terminal of the first D flip-flop (605) and is used as the output terminal ($Pulse_p$) of the rising edge detection circuit (408);

the output terminal (Reset) and enable terminal (EN) of the timer circuit (403) are connected to the two input terminals of the second NAND gate (611) respectively, the output terminal of the second NAND gate (611) is connected to the input terminal of the fifth inverter (612), the output terminal of the fifth inverter (612) is connected to the other input terminal of the third NAND gate (613), the output terminal of the third NAND gate (613) is connected to the input terminal of the sixth inverter (614), the output terminal of the sixth inverter (614) is connected to the enable input terminal of the first D flip-flop (605), the data input terminal of the first D flip-flop (605) is connected to the first power input (604), and the output terminal of the first D flip-flop (605) is used as the output terminal ($SEL_p$) of the rising edge detection circuit (408).

6. The switching power supply with quick transient response according to claim 2, wherein, the falling edge detection circuit (409) comprises a second inverter delay chain (606), a seventh inverter (607), an eighth inverter (609), a third NOR gate (608), a fourth NOR gate (616), a fourth NAND gate (615), and a second D flip-flop (610); the output terminal ($Q_{p2}$) of the delay comparator (401) is connected to the input terminal of the second inverter delay chain (606), an input terminal of the third NOR gate (608) and an input terminal of the fourth NOR gate (616) respectively, the output terminal of the second inverter delay chain (606) is connected to the input terminal of the seventh inverter (607), the output terminal of the seventh inverter (607) is connected to the other input terminal of the third NOR gate (608), the output terminal of the third NOR gate (608) is connected to the input terminal of the eighth inverter (609), the output terminal of the eighth inverter (609) is connected to the clock input terminal of the D flip-flop (610) and is used as the output terminal ($Pulse_n$) of the falling edge detection circuit (409);

the output terminal (Reset) and enable terminal (EN) of the timer circuit (403) are connected to the two input terminals of the fourth NAND gate (615) respectively, the output terminal of the fourth NAND gate (615) is connected to the other input terminal of the fourth NOR gate (616), the output terminal of the fourth NOR gate (616) is connected to the enable input terminal of the second D flip-flop (610), the data input terminal of the second D flip-flop (610) is connected to the first power input (604), and the output terminal of the second D flip-flop (610) is used as the output terminal ($SEL_n$) of the falling edge detection circuit (409).

7. The switching power supply with quick transient response according to claim 2, wherein, the timer circuit (403) comprises a ninth inverter (701), a tenth inverter (709), and an eleventh inverter (710), a fifth NAND gate (703), a fifth NOR gate (702), a third D flip-flop (705), a fourth D flip-flop (706), a fifth D flip-flop (707), a third inverter delay chain (708), and a second power input (704);

the output terminal ($Pulse_p$) of the rising edge detection circuit (408) and the output terminal ($Pulse_n$) of the falling edge detection circuit (409) are connected to the two input terminals of the fifth NAND gate (703) respectively, the output terminal of the fifth NAND gate (703) is connected to the input terminal of the tenth inverter (709), and the output terminal of the tenth inverter (709) is connected to the clock input terminal of the third D flip-flop (705);

the enable terminal (EN) is connected to the input terminal of the ninth inverter (701), the output terminal of the ninth inverter (701) is connected to an input terminal of the fifth NOR gate (702), the other input terminal of the fifth NOR gate (702) is connected to the output terminal of the third inverter delay chain (708), the output terminal of the fifth NOR gate (702) is connected to the enable input terminal of the third D flip-flop (705), the data input terminal of the third D flip-flop (705) is connected to the second power input (704), the output terminal of the third D flip-flop (705) is connected to the enable input terminals of the fourth D flip-flop (706) and fifth D flip-flop (707), the clock input terminal of the fourth D flip-flop (706) is connected to the output terminal (CLK)

of the oscillator (109), the data input terminal of the fourth D flip-flop (706) is connected to the antiphase output terminal of the D flip-flop (706) and the clock input terminal of the fifth D flip-flop (707) respectively, the data input terminal of the fifth D flip-flop (707) is connected to the antiphase output terminal of the fifth D flip-flop (707), the positive phase output terminal of the fifth D flip-flop (707) is connected to the input terminal of the eleventh inverter (710) and the input terminal of the third inverter delay chain (708) respectively, and the output terminal of the eleventh inverter (710) is used as the output terminal (Reset) of the timer circuit (403).

8. The switching power supply with quick transient response according to claim 1, wherein,
the PWM controller (101) comprises an error amplifier (103), a PWM comparator (104), a RS flip-flop (105), a current detection circuit (107), and a ramp current compensation circuit (108);
the positive phase input terminal of the error amplifier (103) is used as the reference voltage input terminal of the PWM controller (101), the negative phase input terminal of the error amplifier (103) is used as the voltage feedback signal input terminal of the PWM controller (101), the output terminal ($V_e$) of the error amplifier (103) is connected to the positive phase input terminal of the PWM comparator (104), the input terminal of the current detection circuit (107) is used as the current feedback signal input terminal of the PWM controller (101), the output terminal of the current detection circuit (107) is connected to the input terminal of the ramp current compensation circuit (108), the output terminal ($V_{sense}$) of the ramp current compensation circuit (108) is connected to the negative phase input terminal of the PWM comparator (104), the output terminal (PO) of the PWM comparator (104) is connected to the reset input terminal (R) of the RS flip-flop (105), the set input terminal (S) of the RS flip-flop (105) is used as the clock input terminal of the PWM controller (101), the positive phase output terminal and negative phase output terminal of the RS flip-flop (105) are used as the output terminal ($Q_{p1}$) and ($Q_{n1}$) of the PWM controller (101) respectively.

9. The switching power supply with quick transient response according to claim 1, wherein,
the power stage (102) comprises a P-MOS tube (111), an N-MOS tube (112), a filter inductor (113), a filter capacitor (114), a load resistor (115), and a third power input (116);
the grid electrode of the P-MOS tube (111) is used as an input terminal ($G_p$) of the power stage (102), the grid electrode of the N-MOS tube (112) is used as the other input terminal ($G_n$) of the power stage (102), the source electrode of the P-MOS tube (111) is connected to the third power input (116), the drain electrode of the P-MOS tube (111) is connected to the drain electrode of the N-MOS tube (112) and one end of the filter inductor (113) respectively and is used as an inductive current feedback output terminal of the power stage (102), and the source electrode of the N-MOS tube (112) is connected to ground potential;
the other end of the filter inductor (113) is connected to one end of the filter capacitor (114) and one end of the load resistor (115) respectively and is used as an output voltage feedback output terminal of the power stage (102), the other end of the filter electric capacity (114) and the other end of the load resistor (115) are connected to ground potential.

10. The switching power supply with quick transient response according to claim 1, wherein,
the grid signal drive circuit (106) comprises a sixth NOR gate (301), a seventh NOR gate (307), a sixth NAND gate (302), a seventh NAND gate (308), a twelfth inverter (303), a thirteenth inverter (304), a fourteenth inverter (306), a fifteenth inverter (309), a first inverter drive chain (305), and a second inverter drive chain (310), one input terminal of the sixth NAND gate (302) is used as an input terminal of the grid signal drive circuit (106), the other input terminal of the sixth NAND gate (302) is connected to the output terminal of the sixth NOR gate (301), the output terminal of the sixth NAND gate (302) is connected to the input terminal of the twelfth inverter (303), the output terminal of the twelfth inverter (303) is connected to the input terminal of the thirteenth inverter (304) and an input terminal of the seventh NOR gate (307) respectively, the output terminal of the thirteenth inverter (304) is connected to the input terminal of the first inverter drive chain (305), the output terminal of the first inverter drive chain (305) is connected to the input terminal of the fourteenth inverter (306) and is used as the output terminal ($G_p$) of the grid signal drive circuit (106), the output terminal of the fourteenth inverter (306) is connected to the other input terminal of the seventh NOR gate (307), the output terminal of the seventh NOR gate (307) is connected to an input terminal of the seventh NAND gate (308), the other input terminal of the seventh NAND gate (308) is used as the other input terminal of the grid signal drive circuit (106), the output terminal of the seventh NAND gate (308) is connected to the input terminal of the fifteenth inverter (309), the output terminal of the fifteenth inverter (309) is connected to the input terminal of the second inverter drive chain (310) and an input terminal of the sixth NOR gate (301) respectively, the output terminal of the second inverter drive chain (310) is connected to the other input terminal of the sixth NOR gate (301) and is used as the output terminal ($G_n$) of the grid signal drive circuit (106).

* * * * *